United States Patent [19]
Saito et al.

[11] Patent Number: 5,175,633
[45] Date of Patent: Dec. 29, 1992

[54] METHOD OF DIAGNOSING OPERATING CONDITIONS OF AN IMAGE PROCESSOR

[75] Inventors: Hiroyuki Saito; Shigehiro Furukawa; Kazuo Hayashi, all of Kanagawa, Japan

[73] Assignee: Fuji Xerox Co., Ltd., Tokyo, Japan

[21] Appl. No.: 595,855

[22] Filed: Oct. 10, 1990

[51] Int. Cl.$^5$ ............................................. H04N 1/417
[52] U.S. Cl. ........................................ 358/406; 375/8; 375/10
[58] Field of Search ............... 358/400, 401, 404, 405, 358/406, 407, 426, 430, 261.1, 261.2, 261.3, 261.4, 262.1, 434, 441, 442, 444, 469; 340/345, 347; 341/51; 375/8, 10

[56] References Cited

FOREIGN PATENT DOCUMENTS

| | | | |
|---|---|---|---|
| 0112171 | 9/1981 | Japan | 358/261.2 |
| 0185449 | 10/1984 | Japan | 375/10 |
| 0163761 | 7/1986 | Japan | 375/8 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

A method of diagnosing the operating conditions of an image processor comprising the steps of preparing a first pattern of data, a second pattern corresponding to the first pattern when it has been compressed normally, a third pattern of data, and a fourth pattern corresponding to the third pattern when it has been expanded normally; diagnosing an operating condition of the compressor by comparing data after the first pattern has been compressed by the compressor with the second pattern; and diagnosing an operating condition of the expander by comparing data obtained after the third pattern has been expanded by the expander with the fourth pattern. The independent diagnosis of the compressor and the expander allows the specific defective chip of component to be identified, thereby facilitating proper repair.

10 Claims, 6 Drawing Sheets

METHOD OF DIAGNOSING OPERATING CONDITIONS OF AN IMAGE PROCESSOR

BACKGROUND OF THE INVENTION

1. Field of the Invention

This invention relates to a method of diagnosing image processors in which image data of an image is compressed and then stored in memory and the compressed image data is read from the memory and then expanded to obtain the original image data for the output of the image.

2. Discussion of the Related Art

Digital copying machines and facsimile machines read the image of a document by an image input unit to obtain image signals and these image signals are digitized to produce image data.

For example, in digital copying machines image signals from an image input unit are generally either processed almost in real time and directly applied to an image output unit or stored in memory in digitized form on a page basis, properly processed, and applied to the image output unit. To increase the copying efficiency, the digital copying machines are also used in combination with an automatic document handler (ADF) or a recirculating automatic document handler (RDH).

An example is a digital copying machine equipped with an ADF which prepares n copies of a document consisting of m pages in sorted form. Copying with an ordinary ADF not capable of recirculating documents requires that n copies be produced successively for each page of the document and that the produced copies be discharged sequentially into n bins using a sorter, and this operation must be repeated for m times to have a set of m-paged copies sorted, one copy in each bin. Copying with an RDH, on the other, allows the required number of copies to be produced in sorted form without using a sorter. That is, m pages of the document are copied sequentially once and the processed copies of m pages are discharged into a discharge tray, and thereafter, the document is recirculated as many times as the required number of copies. However, in the RDH, the document must go through belts and rollers so many times that the risk of a mechanical problem, such as a jamming of the machine, is much increased.

To overcome this shortcoming, it has been proposed that all the image data of the document be stored once in a large-capacity memory and that the stored data be read in proper sequence to be output onto a recording sheet.

For example, all the images in m pages of a document are read by the image input unit to obtain their image signals. The obtained image signals are then converted into corresponding digital signals and stored in a hard disk unit. If the stored digital signals are repeatedly read and output from the hard disk unit in the order of first, second, third, to mth page, first, second, third, to mth page, and so on, a required number of copies can be prepared in sorted form without using a mechanical sorter nor causing the document to be read more than once. That is, electronic recirculating document handling can be achieved.

Further, the image output unit of the copying machine may also be used as a printer for another image data source, e.g., a work station, if it is so arranged that a job can be accepted from another image data source through a communication line and applied to the image output unit during a period in which a job is being read from the image input unit and stored in the storing unit. And upon end of the job from the work station, the stored image data of the document can be read from memory unit and applied to the image output unit to produce copies.

Accordingly, shared use with a workstation of the image output unit of the copying machine contributes to streamlining units of similar function and also eliminating wasteful wait times, thereby utilizing the machine fully. The term "job" herein used is intended to mean a block of image data which is subjected to the same processing.

However, the image data read from the document can be so voluminous that even the use of a large-capacity memory such as a hard disk cannot accommodate all the data. Thus, a technique of storing image data by first compressing it is employed to reduce its volume. To obtain the original data, the codified, or compressed, image data must be read and expanded by an expander. Accordingly, this technique involves both compressor and expander units. The compressor and the expander are usually made up of expensive large scale integrated circuits (LSIs), and the chips thereof are mounted on printed circuit boards.

The above image processor with the compressing and expanding functions will produce greatly distorted images if its compressor or expander unit fails. In fact, distortion of the image may suggest trouble with either the compressor or the expander or both. Thus, whenever the output image is distorted or abnormal, both the compressor and the expander unit must be inspected to find the problem.

In the related art of image processors, the inspection comprises the steps of compressing image data having a predetermined pattern by the compressor, recovering the compressed image data by the expander, and comparing the recovered image data with the original image data. If the compression and expansion are performed normally, both image data under comparison will coincide with each other.

However, such self-diagnosis informs the user only of the presence of an abnormality when there exists a disagreement between the recovered and original image data but not of which unit is causing the abnormality. Thus, the user must remove both the compressor and the expander chips taken from the respective printed circuit boards and replace them with good LSIs or perhaps exchange entire printed circuit boards. This method is disadvantageous in that it not only entails high cost but also does not identify the exact cause of the trouble, thereby making it difficult to take effective measures to prevent future problems. In the case of a system of nonreversible compression in which the recovered data does not always coincide with the original image data even under normal operation, such comparison is of no use in verifying the operating condition.

SUMMARY OF THE INVENTION

The present invention has been made in view of solving the above problems and has as an object providing an improved diagnosis method capable of identifying the defective chip or part, when any abnormality is found in the compressing or expanding or both operations by diagnosing the compressor and the expander independently of each other.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of the present invention of diagnosing operating conditions includes the steps of preparing a first pattern of data, a second pattern of data corresponding to the first pattern after it has been properly compressed by the compressor, a third pattern of data, and a fourth pattern of data corresponding to the third pattern when it has been properly expanded by the expander; diagnosing an operating condition of the compressor by comparing the data after the first pattern of data has been compressed with the second pattern; and diagnosing an operating condition of the expander by comparing the data obtained after the third pattern has been expanded by the expander with the fourth pattern.

The present invention prepares two pairs of self-diagnostic patterns, one pair for the compressor and the other for the expander. More specifically, the one pair consists of the first pattern to be compressed by the compressor and the second pattern to be obtained when the first pattern has been properly compressed and the other pair includes the third pattern to be expanded by the expander and the fourth pattern to be obtained when the third pattern has been properly expanded. To self-diagnose the compressor, the first pattern of data is compressed and this compressed data is compared with the second pattern, while to self-diagnose the expander, the third pattern of data is expanded and this expanded data is compared with the fourth pattern. Any abnormality in compression or expansion appears in the form of disagreement between the actually processed data and the data for the prepared patterns. Thus, the source of failure can be detected.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
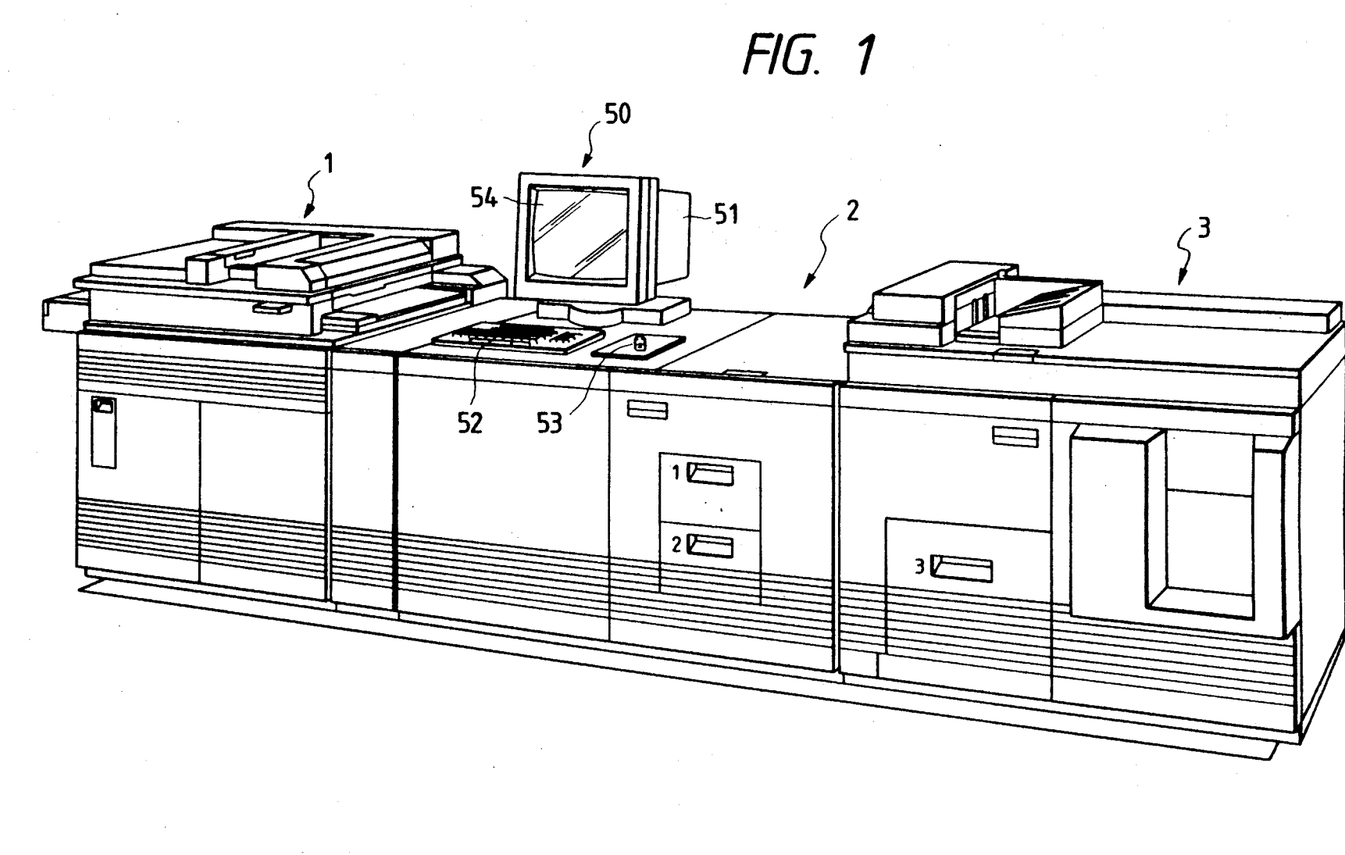
FIG. 1 is a general perspective view depicting a digital copying machine to which the teachings of the present invention are applied.

Referring to FIG. 1, there is shown a digital copying machine to which the teachings of the present invention are applied. The machine comprises scanning section 1 for reading a document, control section 2 for governing the control of the total machine, and printing section 3 for outputting images on recording sheets.

Figure 2:
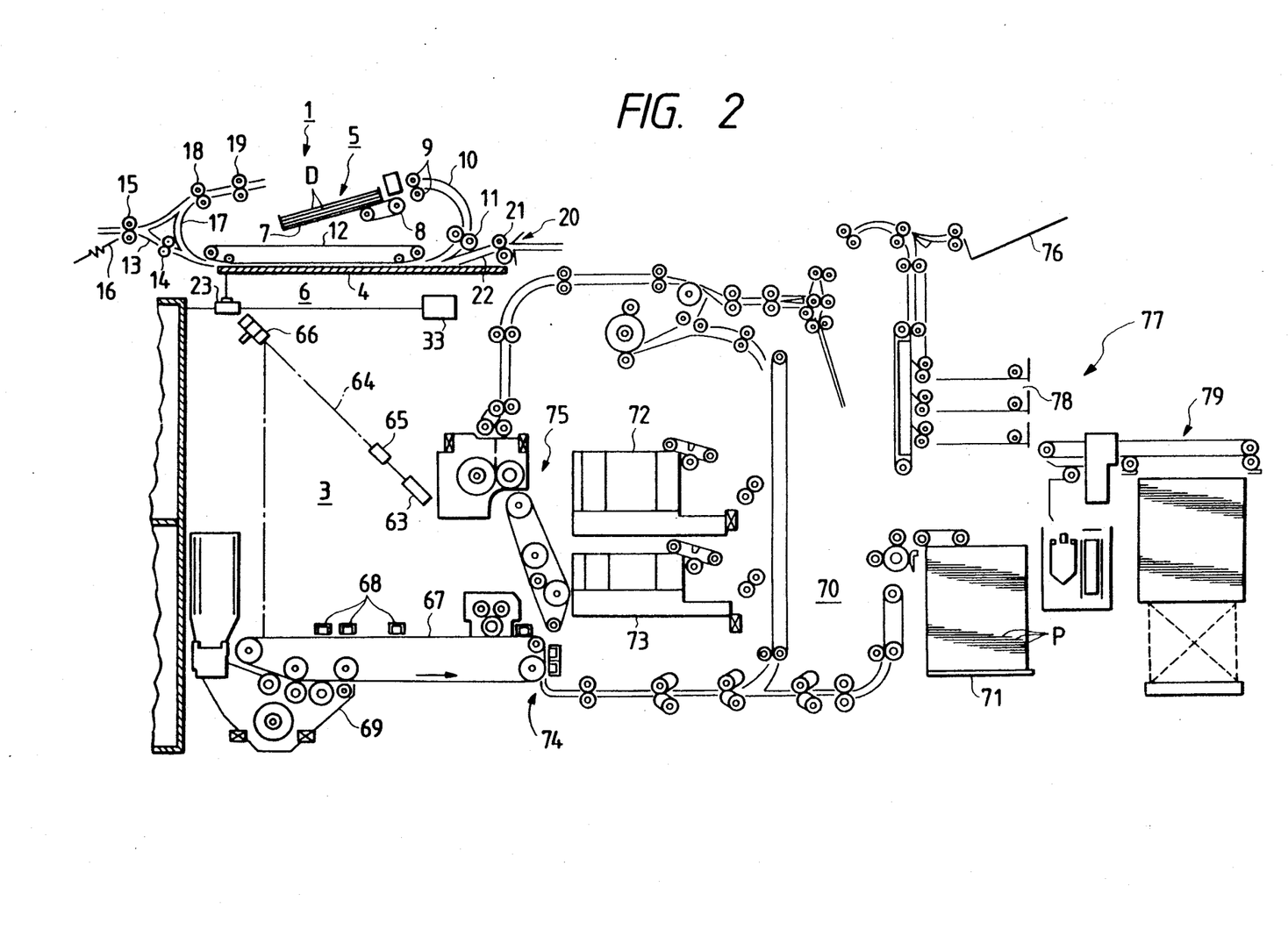
FIG. 2 is a schematic front view illustrating the internal structure of the digital copying machine shown in FIG. 1.

Referring to FIG. 2, which schematically shows the internal structure of the digital copying machine shown in FIG. 1, scanning section 1 comprises automatic document handler 5 for automatically handling document D on transparent platen 4, and image input unit 6 for reading images of document D placed on platen 4 by scanning.

Automatic document handler 5 allows, e.g., three different modes to be selected: a normal automatic document handling mode (ADF mode), a recirculating automatic handling mode (RDH mode), and a semi-automatic document handling mode (SADH mode).

In the normal ADF mode, document D placed face-up on document tray 7 is fed one sheet at a time by vacuum feed belt 8 from the lowermost side of the stack of sheets. Document D is transferred to a predetermined position on platen 4 through document feed roller 9, bent chute 10, document feed roller 11, document feed belt 12, and the like. After being copied, document D is fed toward a chute 13 by document feed belt 12 and discharged into catch tray 16 by document feed rollers 14 and 15. In the RDH mode, the copied document D is, instead of being directly discharged into catch tray 16, returned back to document tray 7 by document feed rollers 18 and 19 by passing through document return chute 17. In the SADH mode, document D is inserted from document entry slot 20, fed between document feed belt 12 and platen 4, and transferred to a predetermined position by document feed belt 12.

Figure 3:
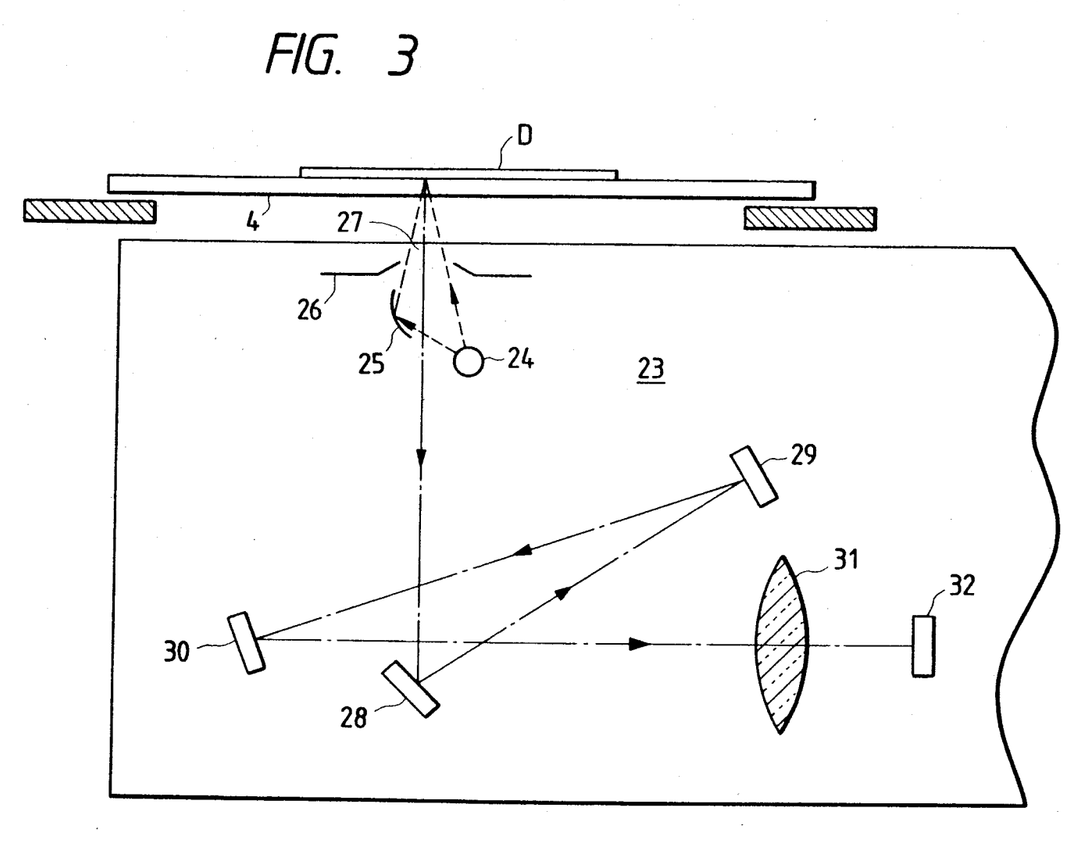
FIG. 3 is a schematic sectional view showing certain construction details of the document scanner for the digital copying machine shown in FIG. 1.

In image input unit 6, document scanner 23 is arranged below platen 4. FIG. 3 is a schematic sectional view showing certain constructional details of the document scanner 23. Document scanner 23 is comprised of exposing lamp 24, reflecting plate 25, slit plate 26, and mirrors 28 to 30, line image sensor 32, and lens 31. Light from lamp 24 falls directly on document D by passing through slit 27 formed on slit plate 26 or by being reflected by reflecting plate 25. The light reflected from document D is reflected by mirrors 28, 29, and 30 to change its path, and focused on line image sensor 32 through lens 31. Document scanner 23 is driven by scanning means 33 and reads images of document D on a page basis by reciprocating horizontally along the bottom surface of platen 4. Image sensor 32 sends image signals corresponding to the image of document D to scanning means 33.

Figure 4:
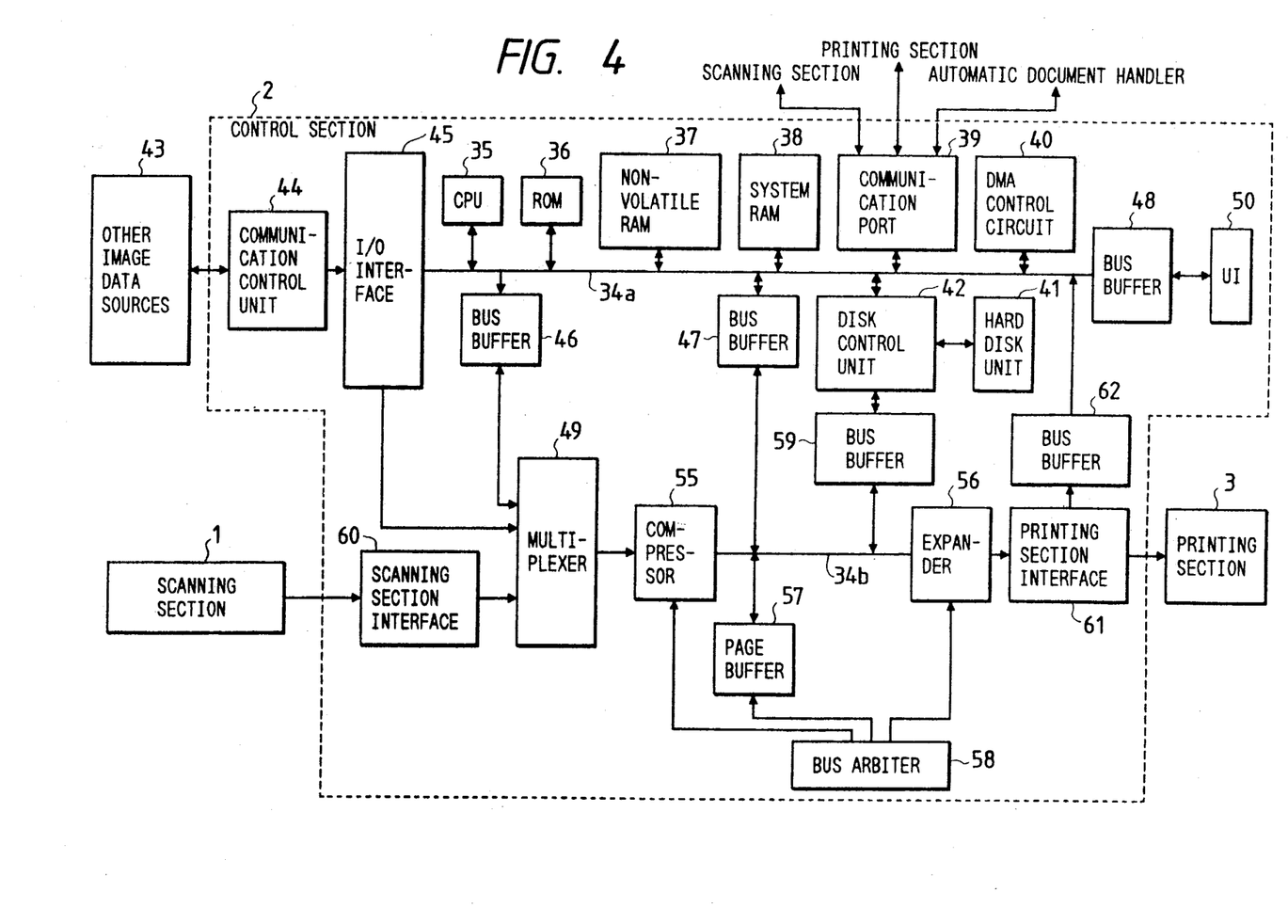
FIG. 4 is a block diagram showing a circuit of the digital copying machine shown in FIG. 1.

Referring now to FIG. 4, there is shown the electrical circuit of the digital copying machine shown in FIG. 1. The circuit is provided with system bus 34a and image data bus 34b. CPU (central processing unit) 35, ROM (read only memory) 36, nonvolatile RAM (random access memory) 37, system RAM 38, communication port 39, DMA (direct memory access) control circuit 40, and disk control unit 42 for controlling read/write operation of hard disk unit 41 are connected to system bus 43a. Input interface 45 is also connected to system bus 34a. Input interface 45 serves to receive image data from other image data sources 43, such as a personal computer, a work station and a facsimile machine, through communication control unit 44. System bus 34a, multiplexer 49, image data bus 34b and user interface (UI) 50 are additionally connected through bus buffers 46, 47 and 48, respectively.

UI 50 comprises display unit 51 capable of displaying an image age on a pixel basis, keyboard 52, and mouse 53, as shown in FIG. 1 and serves to display such data as input instructions to the copying machine or operating conditions of the copying machine. Display unit 51 includes touch screen 54, which, in addition to keyboard 52 and mouse 53, allows a desired input to be made by touching a predetermined displayed icon.

On the other hand, compressor 55, expander 56, and page buffer 57 are connected to image data bus 34b. The interruption request can be provided from compressor 55, expander 56, disk control unit 42, and the like to CPU 35. Upon reception of the interruption requests from those units, CPU 35 reception of the interruption requests from those units, CPU 35 drives DMA control circuit 40. DMA control circuit 40 provides bus arbiter 58 with the access requests to page buffer 57 on the basis of the individual interruption requests. Bus arbiter 58 arbitrates the bus in accordance with the predetermined priority order. As a result, compressor 55, expander 56, page buffer 57, and the like operate on the basis of instructions from bus arbiter 58. Between image data bus 34b and disk control unit 42 there is provided bus buffer 59.

Compressor 55 is supplied with image data from scanning section 1 through scanning section interface 60 and multiplexer 49. Expander 56 outputs are fed to printing section 3 through printing section interface 61. Between printing section interface 61 and system bus 34a there is provided bus buffer 62.

Printing section 3 comprises a raster output scanner (ROS) of, e.g., the laser printer type utilizing electrophotographic technology. As shown in FIG. 2, beam 64 from laser 63 is modulated in accordance with the image data input by acousto-optic modulator 65 and caused to scan (traverse) belt-like photoreceptor 67 using the mirrored facets of rotating polygon 66. Photoreceptor 67 is uniformly charged by a plurality of corotrons 68 and a latent electrostatic image is formed thereon by the modulated laser beam. This latent electrostatic image is developed by developer 69 and, as a result, a toner image is formed on photoreceptor 67. This toner image on photoreceptor 67 is then transferred at transfer section 74 while positioned on recording sheet P brought forward at a predetermined timing either from main sheet feed tray 71 or auxiliary sheet feed trays 72 and 73 of sheet feeder 70, and output as an image on recording sheet P. Recording sheet P having received the transferred image is forwarded to fusing unit 75 where the toner image is fused, and a final copy is fed either to discharge tray 76 or finisher 77. Finisher 77 includes a stapler 78 for stapling the copies together and a thermal binder 79 for adhesively binding the copies into books.

For operation of the above described digital copying machine, a case in which automatic document handler 5 is operated in the ADF mode will be described.

An instruction to start copying is given by operating UI 50 through a keyboard 52, mouse 53, or touch screen 54 shown in FIG. 1 or 4. This instruction is fed to CPU 35 through bus buffer 48 and system bus 34a, and control data that commands the start operation is applied to automatic document handler 5 at scanning section 1 through communication port 39 in accordance with a program written in ROM 36. Document D resting faceup on document tray 7 is then picked up sheet by sheet by vacuum feed belt 8 to be forwarded to a predetermined position on platen 4 through document feed roller 9, bent chute 10, document feed roller 11, and document feed belt 12. Upon completion of the placement of document D, control data that commands the start operation is applied, in turn, to image input unit 6 at scanning section 1 through communication port 39, and, as a result, document scanner 23 is moved along the bottom surface of platen 4 to read the image on document D and obtain the image data thereof.

Image signals from scanning section 1, on one hand, are digitized by an image processing circuit (not shown) arranged within scanning section 1 and applied to control section 2 after being subjected to a predetermined image processing.

The image data from scanning section 1, on the other hand, is applied to compressor 55 through scanning section interface 60 and multiplexer 49. Compressor 55 performs, a reversible adaptive compression using, e.g., adaptive prediction encoding method. For example, character documents can be compressed to about 1/10, and half-tone images, to about ⅓ the original. A through mode allowing the image data to bypass compression is also available in compressor 55.

Figure 5:
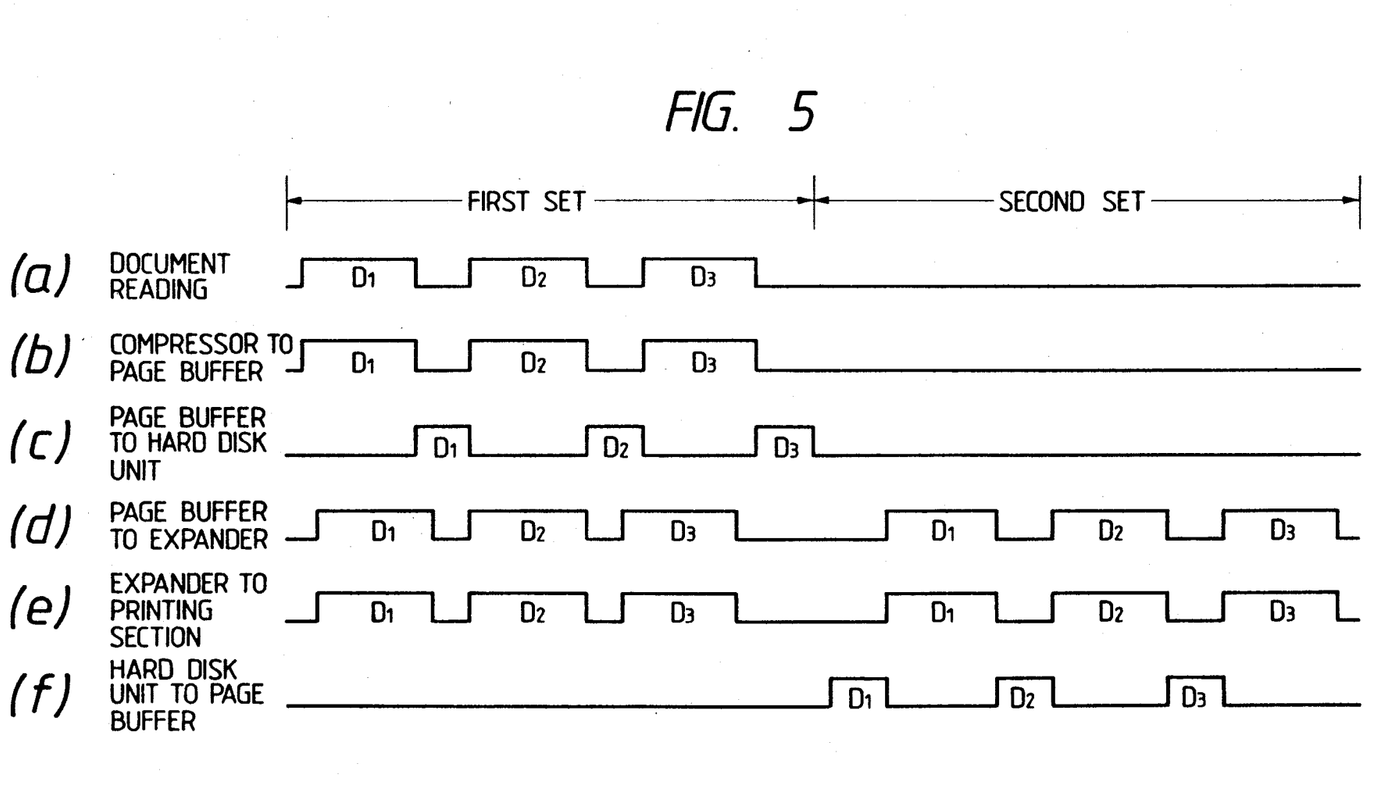
FIGS. 5(a) through 5(f) comprise a timing chart explaining the operation of the digital copying machine shown in FIG. 1.

A case in which two or more copies are prepared for each of three pages of a document, $D_1$, $D_2$, $D_3$ will now be described as an example. As shown in FIG. 5 (a), three pages $D_1$, $D_2$, $D_3$, are sequentially read at scanning section 3 to obtain the image data corresponding to the images of each document page. Each image data thus obtained is compressed by compressor 55 and each compressed image data is written to page buffer 57 by DMA transfer as shown in FIG. 5(b). To print each image for the second copy et seq., DMA transfer is employed to write the compressed image data from page buffer 57 to hard disk unit 41 through bus buffer 59 and disk control unit 42 as shown in FIG. 5(c). As shown in FIG. 5(d), for the first copy of each document, the original image data is recovered by being DMA-transferred from page buffer 57 to expander 56. The above 3-channel DMA transfer is managed by bus arbiter 58 and DMA control circuit 40.

As shown in FIG. 5(e), each image data expanded by expander 56 is then applied to printing section 3 through printing section interface 61. At printing section 3, beam 64 from laser 63 is modulated by the image data to form a latent electrostatic image on photoreceptor 67. This latent electrostatic image is developed by developer 69 to be processed into a toner image, which is then transferred onto the recording sheet at transfer section 74, and then fused at fuser 75 and discharged into discharge tray 76. Accordingly, the images of the document are printed on the recording sheets in the order of pages $D_1$, $D_2$, $D_3$ to obtain their first copies.

From the second copies onward, no document reading or image data compression are performed. Each compressed image data written to hard disk unit 41 during processing of the first copy is read as shown in FIG. 5(f), transferred to page buffer 57, and further transferred to expander 56 from page buffer 57. The compressed image data thus transferred is expanded in the same manner as in the first copy and fed to printing section 3 where the second copies are produced.

By repeating the above operation, the desired number of copies are discharged into discharge tray 76 at printing section 3 in the order of $D_1$, $D_2$, $D_3$, $D_1$, $D_2$, $D_3$, . . . in sorted form.

The operation of the above copying machine in the mode of self-diagnosing compressor 55 and expander 56 will now be described.

In this embodiment, the four self-diagnostic patterns $P_1$ to $P_4$ are written in advance to ROM 36 on system bus 34a or to hard disk unit 41. First pattern $P_1$ is an original pattern to be compressed by compressor 55 and second pattern $P_2$ is the compressed pattern obtained when first pattern $P_3$ has been properly compressed by compressor 55. Third pattern $P_3$ is an original pattern to be expanded by expander 56 and fourth pattern $P_4$ is the expanded pattern obtained when the third pattern $P_3$ is properly expanded. First pattern $P_1$ may consist, e.g., of black and white pixels alternately arrayed; i.e., a pattern expressed by reiterating a pair of signals 1 and 0 such as 1 0 1 0 1 0 . . .. It is noted that the pattern $P_1$ is not restricted to this pattern. In the self-diagnosis mode, CPU 35 accesses the pattern $P_1$ and develops it in page buffer 57.

Compressor 55 is inspected by reading first pattern $P_1$ from ROM 36 or hard disk unit 41 and applying it to compressor 55 through bus buffer 46 and multiplexer 49 and by writing the compressed data to page buffer 57. CPU 35 then compares the data compressed by compressor 55 with second pattern $P_2$ that is the correctly compressed data prepared in advance by accessing the former data on a word basis. Upon detection of any disagreement, display unit 51 of UI 50 displays a message indicating the trouble of compressor 55. If necessary, a bit pattern corresponding to a character string indicating the inspected result may be generated and applied to printing section 3 to produce a printout or to inform an external unit of the result through communication control unit 44 and the communication line.

Expander 56 is inspected by first reading third pattern $P^e$ from ROM 36 or hard disk unit 41 and applying it to expander 56 through bus buffer 47 or 59 and by writing the expanded data to page buffer 57 through printing section interface 61, bus buffer 62, system bus 34a, and bus buffer 47. In a similar manner as in the inspection of compressor 55, the data expanded by expander 56 is compared with fourth pattern $P_4$ that is a pattern to be obtained when the expanding operation is properly performed. The message that expander 56 is in trouble will be displayed or printed if there is any disagreement.

The above diagnosis can be activated at a time when the machine is turned on, or when so instructed from an external unit through communication control unit 44, or when forcibly instructed by an operator from UI 50, or periodically, e.g., once every 24 hours. This diagnosis can be used not only during inspection when the machine is installed but also during copy production.

Figure 6:
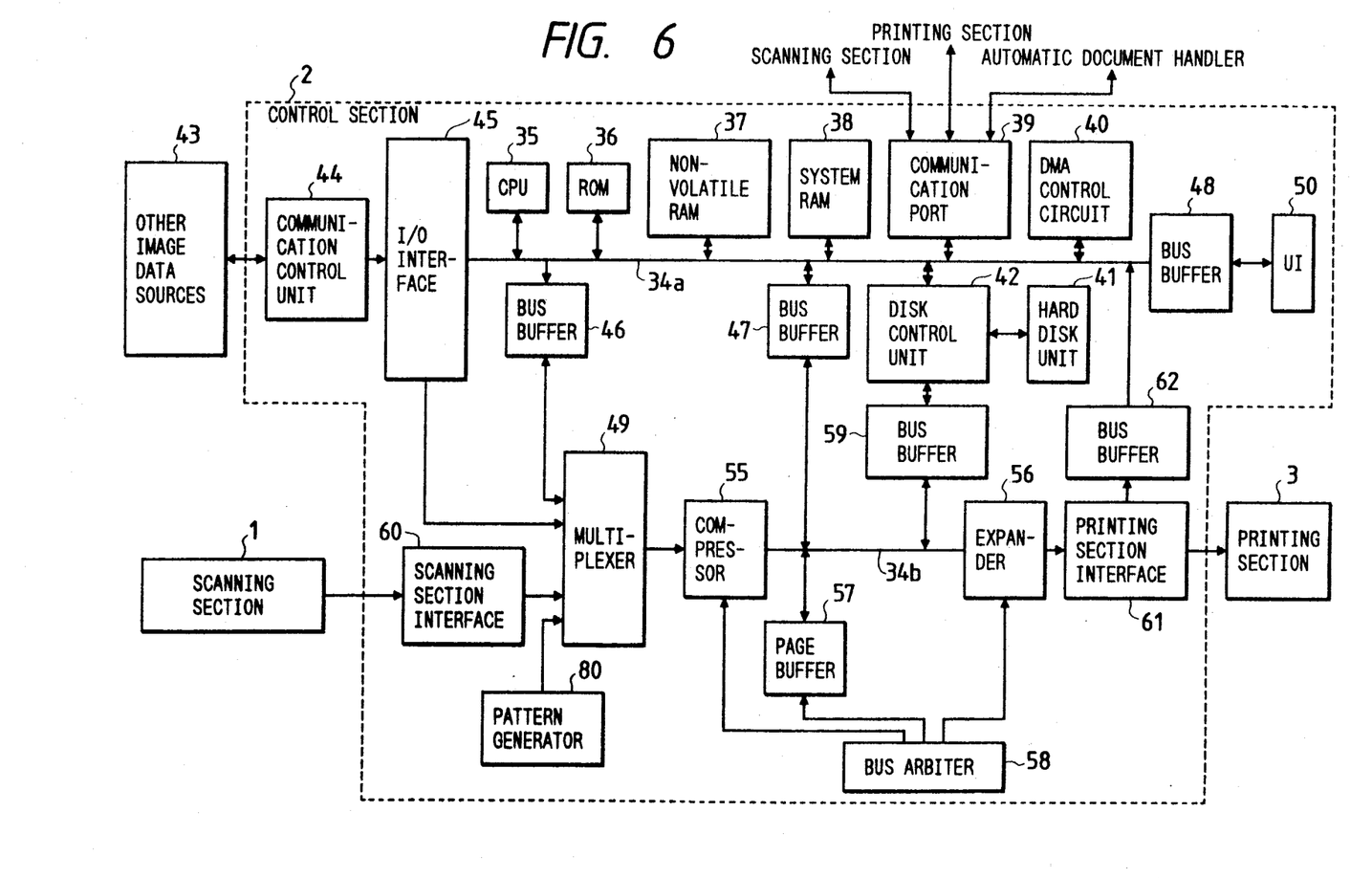
FIG. 6 is a block diagram showing another circuit of the digital copying machine shown in FIG. 1.

The above description refers to the case in which the four diagnostic patterns $P_1$ to $P_4$ are pre-stored in ROM 36 or hard disk unit 41. However, as shown in FIG. 6, a dedicated pattern generator 80 for generating patterns may instead be provided. For example, a simple pattern may be employed as patterns $P_1$ and $P_3$, because they may be any optional pattern. The output of pattern generator 80 is supplied to compressor 55 through multiplexer 49.

A pattern of data consisting of, e.g., a repetition of signals such as 1 0 1 0 can easily be generated by a simple oscillator or a pulse generator. As a result, the patterns of data do not have to be stored in ROM 36 or hard disk unit 41, thereby allowing memory to be used efficiently. This is particularly advantageous when the patterns consume a large data volume. Since patterns that can be produced by pattern generator 80 are regularly arranged patterns, it is possible to use them as test patterns to adjust and test printing section 3.

Pattern $P_2$ after compression and pattern $P_4$ after expansion have a pattern which is periodical to some extent, that is, include repetitive identical portions. Therefore, the use of dedicated pattern generators for $P_2$ and $P_4$ can still have an advantage compared with the case of storing all the patterns $P_1$ through $P_4$ in a memory.

Instead of preparing only one kind of pattern each for compression and expansion as described in the above embodiments, a plurality of patterns may be prepared. For reversible compression, first and fourth patterns $P_1$ and $P_4$, and second and third patterns $P_2$ and $P_3$ may be shared, respectively. In this case, it is possible to reduce the amount of memory used in ROM 36 or hard disk unit 41.

As described in the foregoing pages, the present invention, allowing independent diagnosis of the compressor and the expander, can identify the specific source of abnormality. As a result, proper measures may be taken, facilitating the repair of the system. The replacement of only defective chips or components can save expensive parts. The diagnosis also functions properly when applied to nonreversible compression.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of diagnosing abnormal operation of an image processor in which image data is compressed by a compressor and stored in memory and said compressed image data is read from said memory and then expanded by an expander to obtain image data for output of said image, said method comprising the steps of:
   (a) preparing a first pattern of data, a second pattern of data corresponding to said first pattern when it has been properly compressed by said compressor, a third pattern of data, and a fourth pattern of data corresponding to said third pattern when it has been properly expanded by said expander;
   (b) diagnosing an operating condition of said compressor by comparing the data after said first pattern of data has been compressed by said compressor with said second pattern; and
   (c) diagnosing an operating condition of said expander by comparing the data obtained after said third pattern has been expanded by said expander with said fourth pattern.

2. The method according to claim 1, further including the step of storing each of said first through fourth patterns of data.

3. The method according to claim 2, wherein each of said patterns is stored in a read only memory.

4. The method according to claim 2, wherein each of said patterns is stored in a hard disk unit.

5. The method according to claim 2, wherein the step of diagnosing an operating condition of said compressor includes retrieving said first and second patterns of data from storage.

6. The method according to claim 5, wherein the step of diagnosing an operating condition of said compressor further includes the steps of applying the first pattern of data to said compressor; storing the resulting compressed data outputted from said compressor; and comparing said compressed data with the second pattern of data.

7. The method according to claim 1, wherein the step of diagnosing an operating condition of said expander includes retrieving said third and fourth patterns of data from storage.

8. The method according to claim 7, wherein the step of diagnosing an operating condition of said expander further includes the steps of applying the third pattern of data to said expander; storing the resulting expanded data outputted from said expander; and comparing said expanded data with the fourth pattern of data.

9. The method according to claim 1, wherein said step of preparing the first through fourth patterns of data includes generating said patterns of data using a pattern generator for generating a repetition of signals.

10. The method according to claim 1, wherein the first and fourth patterns of data are the same and the second and third patterns are the same.

* * * * *